May 5, 1953     T. BACKUS     2,637,222
SHIFT CONTROL FOR AUXILIARY TRANSMISSIONS
Filed Jan. 12, 1951     3 Sheets-Sheet 1

THOMAS BACKUS

Inventor

Attorney

May 5, 1953

T. BACKUS 2,637,222

SHIFT CONTROL FOR AUXILIARY TRANSMISSIONS

Filed Jan. 12, 1951

Inventor
THOMAS BACKUS

Attorney

May 5, 1953     T. BACKUS     2,637,222
SHIFT CONTROL FOR AUXILIARY TRANSMISSIONS
Filed Jan. 12, 1951     3 Sheets-Sheet 3
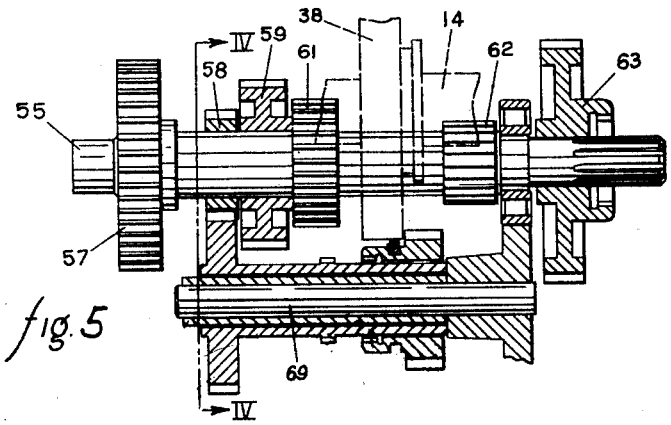
fig.5
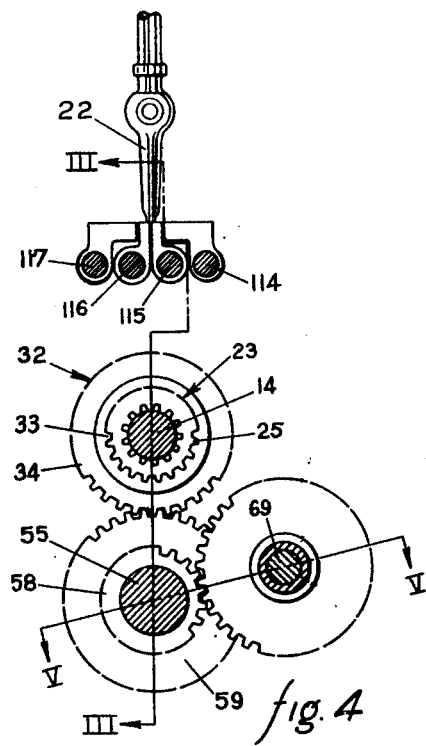
fig.4
Inventor
THOMAS BACKUS
Attorney Patented May 5, 1953

2,637,222

UNITED STATES PATENT OFFICE 2,637,222

SHIFT CONTROL FOR AUXILIARY TRANSMISSIONS

Thomas Backus, Kalamazoo, Mich., assignor to Fuller Manufacturing Company, Kalamazoo, Mich., a corporation of Delaware Application January 12, 1951, Serial No. 205,751

22 Claims. (Cl. 74—745)

This invention relates in general to a device for controlling and effecting the shift of an auxiliary transmission and more particularly to a type of device which is dependent for initiation of its operation upon a shift toward neutral of the main transmission with which said auxiliary transmission is associated.

In the transmission structure disclosed in the application of Ludvigsen and Backus, Serial No. 133,404, there was provided a transmission arrangement comprising a main gear group, an auxiliary gear group connected in series with the main gear group having a ratio in its speed change position substantially equal to the ratios included within a selected portion of the main transmission, and semi-automatic means for shifting said auxiliary gear group at the will of the operator but subject to the limitation that such shifting can take place only when the main gear group is in neutral position. Through this arrangement, it is possible to shift the combined main and auxiliary transmissions from low position to high position, passing twice through the entire range of said selected portion of said main transmission with only one simultaneous shift of the gears in both gear groups, all as explained in detail in said application.

In the specific embodiment disclosed in said application, a hydraulic mechanism was utilized for actuating the auxiliary gear group. It is the purpose of this invention to disclose and claim a further structure capable of carrying out the same broad purposes.

Accordingly, a principal object of this invention is to provide means for semi-automatically shifting an auxiliary gear group at the will of an operator but only when an associated main gear group is in neutral position.

A further object of this invention is to provide means for semi-automatically initiating the shift of an auxiliary gear group at the will of an operator when an associated main gear group is shifted toward its neutral position.

A further object of this invention is to provide means of the general nature, as aforesaid, which is accurate and reliable in operation.

A further object of this invention is to provide apparatus of the general nature, as aforesaid, which is sufficiently simple in construction to be fabricated economically and to require a minimum of maintenance.

A further object of the invention is to provide equipment of the general type, as aforesaid; which is sufficiently flexible to permit its installation in any conventional type of truck, tractor or similar heavy duty vehicle.

A further object of the invention is to provide means of the general nature, as aforesaid, in which the point of initiation of shifting of the auxiliary gear group with respect to the entry of the main gears into neutral may be controlled with a high degree of accuracy.

Other objects and purposes of this invention will become apparent to those persons acquainted with this type of apparatus upon reference to the accompanying drawing and the following specification.

In the drawings:

Figure 4 is a section of the transmission shown in Figure 3 and taken on the line IV—IV of Figure 3.

Figure 5 is a section of the transmission shown in Figures 3 and 4 and taken on the line V—V of Figure 4.

Construction in general

The structure in general comprises hydraulically energized actuating means for effecting power shifting of the auxiliary gear group and electrical means controlling said actuating means.

More specifically, the hydraulically energized, or operating, part of the device includes a shift fork connected to the auxiliary gear group, a hydraulic cylinder actuating the shift fork, a source of fluid under pressure and a solenoid controlled valve controlling the flow of said fluid from the source to one end, or to the other end, of the cylinder. The electrical, or control, part of the device includes in series circuit, a source of constant potential, the solenoid controlling the solenoid controlled valve, a reversing switch for reversing the direction in which said solenoid core is urged and a plurality of control switches.

The control switches are positioned for actuation of each, respectively, by the shift rods of the main gear group, each individual switch being opened as the shift rod with which it is associated is moved into a shifted position. So long as the main gear group is in a shifted position, one control switch will be open and the solenoid is not energized. When the main gear group moves toward neutral position, the open switch is permitted to close and the solenoid is energized. It will then move the valve controlled thereby, or not move it, depending upon the position of the reversing switch, and the flow of pressure fluid is thus directed into one end or the other of the hydraulic cylinder. Thus, upon proper setting of the reversing switch, shifting in the auxiliary gear group is effected automatically by movement of the main gear group toward neutral position and the energization of the means effecting shifting of said auxiliary gear group is commenced prior to the attainment of full neutral position by the main gear group.

Construction in detail

Figure 3:
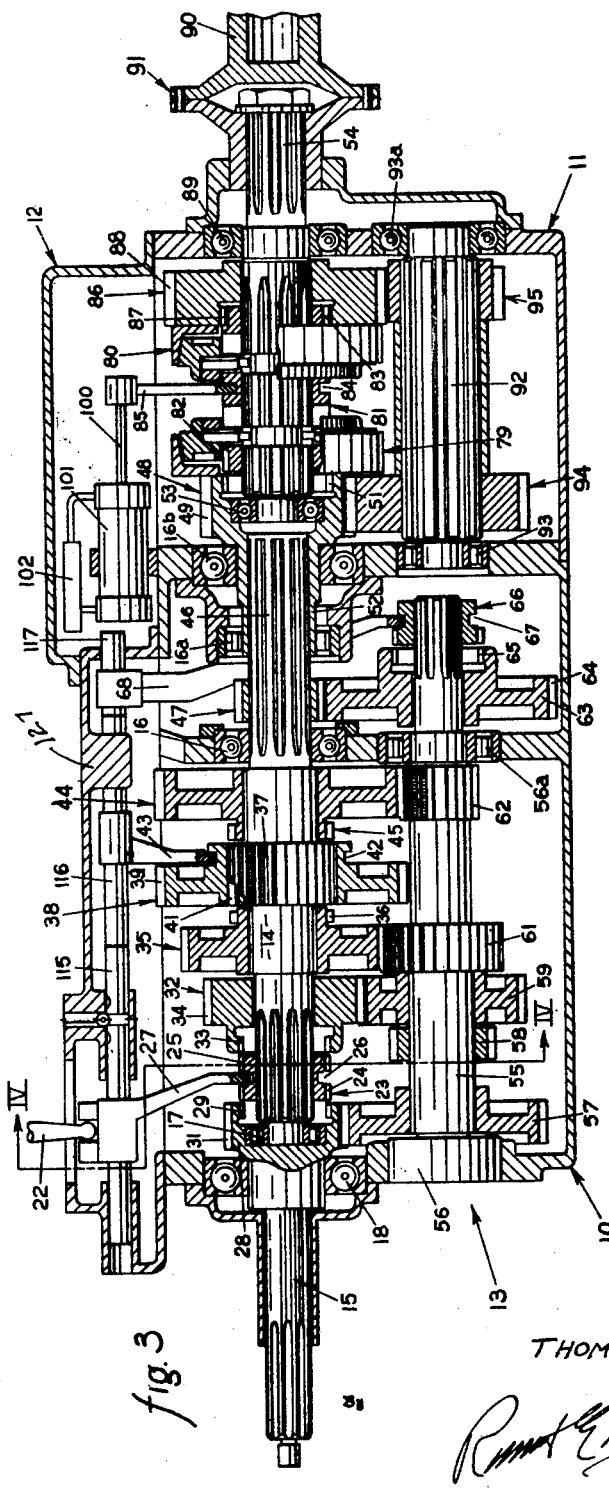
Figure 3 is a sectional view of one typical form of transmission assembly in which my invention may be used, said section being taken on the line III—III of Figure 4.

In the specific embodiment of the invention herein disclosed, there is provided a main box 10 containing a main gear group, which is associated at one end with an auxiliary box 11 containing an auxiliary gear group in series connection with said main gear group, and at the other end with an input shaft 15 connectable with the clutch of a vehicle (not shown). An output shaft 54 extends from the auxiliary box 11 for connection to a propeller shaft 90 in a conventional manner. Both of said gear groups may be in a single housing (Figures 1 and 3) but are here shown in two separate housings for convenience in reference. The auxiliary gear group is provided with synchronizers preferably of the friction clutch type. The details of both of said gear groups, including said synchronizers, may be as shown in Figures 3, 4 and 5: For the purpose of convenience in description, the terms "leftwardly" and "rightwardly," as used in this specification, will be understood to mean leftwardly and rightwardly with respect to the transmission assembly 13 when positioned as appearing in Figure 3. The terms "inwardly" and "outwardly" shall be understood to have reference to the geometric center of the transmission assembly 13 or the sections 10, 11 and 12, thereof. The terms "upper" or "upwardly" and "lower" or "downwardly" shall be understood to refer to the assembly 13 when positioned and/or operating in its normal manner of use.

With specific reference now to the main box here selected for illustrative purposes, the main transmission box 10 is provided with a centrally disposed main shaft 14 and an input shaft 15, which shafts are preferably coaxial, with their adjacent ends closely spaced from each other within the main transmission section 10. The main shaft 14 is rotatably supported upon the main bearings 16, 16a and 16b within the main box 10 and the pilot bearing 17, said pilot bearing being mounted in and upon the adjacent end of the input shaft 15. The input shaft 15 is rotatably supported in one end of the main box 10 by means of the main bearing 18. The leftward end of the input shaft 15 is splined for conventional coupling usually through a clutch with said power means and is supported by a clutch pilot bearing (not shown).

The leftward end of the main shaft 14 is splined for axially movable support of the clutch member 23 having leftward and rightward sets of external teeth 24 and 25, respectively. The clutch member 23 is provided with a circumferential groove 26 between said teeth for engagement by a clutch fork 27, which fork is actuable by a shift lever 22 in a conventional manner.

The rightward end of the input shaft 15 is provided with an input gear 28 having internal and external teeth 29 and 31, respectively. The internal teeth 29 of the input gear 28 are engageable by the leftward teeth 24 of the clutch member 23 when said clutch member is in its leftward position upon the splined portion of the main shaft 14.

A small floating gear 32 which is rotatably supported upon the main shaft 14 adjacent to the clutch member 23, is provided with external teeth 34 and internal teeth 33 selectively engageable by the rightward teeth 25 of said clutch member 23.

A medium floating gear 35 is rotatably supported upon the main shaft 14 adjacent to the rightward side of said floating gear 32 and is provided with clutch teeth 36. A shaft gear 37 is positioned adjacent to said clutch teeth 36. A ring gear 38, having external teeth 39, is provided with internal teeth 41 whereby said ring gear is supported upon and engaged by the shaft gear 37 and is axially movable leftwardly and rightwardly with respect thereto. The ring gear 38 is provided with a circumferential groove 42 engageable by a clutch fork 43 which clutch fork is actuable by means of the shift lever 22 in a conventional manner.

A large floating gear 44, having clutching teeth 45, is rotatably supported upon the main shaft 14 adjacent to the rightward side of the shaft gear 37.

The rightward end 46 of the main shaft 14 is splined in a conventional manner and extends through the rightward end of the main box 10 into the auxiliary box 11. A second ring gear 47 has an internally splined, centrally disposed, opening for support upon and engagement with the splined rightward end of the main shaft 14, and is disposed adjacent to the rightward side of the main bearing 16.

A main output gear 48, having external teeth 49, internal teeth 51 and being within the auxiliary transmission box 11, is provided with a hub 52 which is internally splined for engagement with the rightward end 46 of the main shaft 14. The main bearings 16a and 16b encircle the hub 52 for support thereof. A pilot bearing 53 is mounted substantially within the rightward side of the output gear 48 for rotatable support of the leftward end of the auxiliary main shaft 54 hereinafter described.

A main countershaft 55 is rotatably supported within the main box 10, preferably directly below the main shaft 14 and parallel therewith, by the bearings 56 and 56a. A spur gear 57 is secured to the countershaft 55 adjacent to the bearing 56 for continuous engagement with the external teeth 31 of the input gear 28. A small spur gear 58 is secured to the countershaft 55 adjacent to the rightward side of said gear 57. A medium spur gear 59 is secured to the countershaft 55 adjacent to the rightward side of the small spur gear 58 for continuous engagement with the external teeth 34 of the small floating gear 32. A large spur gear 61 is on the countershaft 55 in continuous engagement with the medium floating gear 35.

A small countershaft gear 62 is spaced rightwardly from the large spur gear 61 and is continuously engageable with the large floating gear 44.

A countershaft floating gear 63, having external teeth 64 and internal teeth 65, is rotatably supported upon the countershaft 55 adjacent to the rightward side of the bearing 56a.

The rightward end of the countershaft 55 is splined in a conventional manner. A clutch member 66, having a circumferential groove 67, is provided with an internally splined, centrally disposed opening for axially slidable support of the member upon the splined rightward end of the countershaft 55. The clutch member 66, which is adjacent to the floating gear 63, has external teeth engageable by the internal teeth 65 of the said floating gear 63. The circumferential groove 67 is engaged by a clutch fork 68 which is actuable by the clutch lever 22 in a conventional manner. The external teeth 64 of the floating gear 63 are continuously engageable by and with the second ring gear 47.

A reverse idler shaft 69 (Figure 5) is secured within the main transmission box 10, is disposed parallel with the countershaft 55, and is spaced substantially horizontally therefrom. Since it is provided with conventional gearing and operated in a conventional manner, detailed description thereof is considered unnecessary and is accordingly omitted.

*The auxiliary box*

While a wide variety of specific gear structures, including planetary, may be utilized in the auxiliary box, the hereinafter described construction has been found satisfactory and will be described in detail for illustrative purposes. However, whatever specific arrangement is utilized, it will usually provide two ratios of power transmission which ratios differ by an amount normally equal to the entire range of the main box plus about one half step. Alternatively, however, the auxiliary box ratios may differ by an amount equal to, or a little greater than, some selected portion of the main box gears.

The auxiliary main shaft 54 is disposed within the auxiliary box 11 and is coaxial with the main shaft 14. Its leftward end is supported by the bearing 53 and a point near its rightward end is supported by the bearing 89. The extreme rightward end of the auxiliary shaft 54 is splined in a conventional manner for engagement with a propeller shaft 90 by means of any conventional, convenient, coupling 91. A clutch sleeve 81 is slidably supported upon the auxiliary shaft 54 adjacent to the main output gear 48 and is engaged for rotation therewith by suitable splining.

The clutch sleeve 81 is provided with leftward and rightward rings of external teeth 82 and 83, respectively, adjacent to the axial faces thereof, and a circumferential groove 84 is disposed intermediate the rings of teeth. The circumferential groove 84 is engaged by a clutch fork 85, secured to a semiautomatic shifting device, hereinafter described in detail, for reciprocable movement of the clutch sleeve 81 on the auxiliary shaft 54. The leftward teeth 82 of the clutch sleeve 81 are controllably engageable with the internal teeth 51 of the main output gear 48, such control being effected by the synchronizing clutch 79 when the clutch sleeve 81 is moved leftwardly along the auxiliary main shaft 54. An auxiliary output gear 86 which is rotatably supported upon the auxiliary main shaft 54 adjacent to the rightward side of clutch sleeve 81, is provided with internal teeth 87 and external teeth 88. The rightward ring of teeth 83 on the clutch sleeve 81 is controllably engageable with the internal teeth 87 of the output gear 86, said control being effected by the synchronizing clutch 80 when the clutch sleeve 81 is moved rightwardly along the auxiliary main shaft 54.

The synchronizing clutches 79 and 80 may be of any convenient and conventional type, such as the cone clutch disclosed and described in Patent No. 2,468,155. Hence, detailed description thereof is omitted here.

It will be understood that the capacity of these synchronizers must be sufficient to effect synchronization, and consequent completion of the auxiliary shift, during the time the shift lever is passing through neutral position at a relatively rapid rate, and preferably during the first half of said passage, having in mind that the entire shift will normally take about 0.6 second on upshift and about 1.8 seconds on a downshift. Thus, synchronization and completion of the auxiliary shift will preferably be completed in substantially less than the 0.5 second and to accomplish this the synchronizers must be of relatively large capacity.

An auxiliary countershaft 92 (Figure 3), which is preferably parallel with the auxiliary main shaft 54 and spaced downwardly therefrom, is rotatably supported at its extremities within the auxiliary box 11 by the bearings 93 and 93a. A large gear 94 is supported upon the auxiliary countershaft 92 near its leftward end for rotation therewith and continuous engagement with the external teeth 49 of the main output gear 48. A pinion gear 95 is supported upon the auxiliary countershaft 92 near its rightward end for rotation therewith and continuous engagement with the external teeth 88 of the auxiliary output gear 86.

Thus, in this embodiment, the auxiliary box 11 is provided with gears effecting a direct drive and a reduction gear ratio. The difference between the direct drive and reduction drive ratios of the auxiliary box in this embodiment of the invention is approximately, one half step greater than the entire speed range between first and fourth gear ratios provided in the main box 10.

It will be understood that the above description of the main transmission box 10 and auxiliary transmission box 11 is given in detail for illustrative purposes, only, and it is not intended that the specific details thereof impose any limitation upon the scope of the invention.

The main gear group is shifted in a conventional manner by the shift lever 22 and the auxiliary gear group is shifted in a conventional manner by the fork 85 which is secured to the actuating rod 100 of the hydraulic cylinder 101. Said hydraulic cylinder is actuated by fluid under pressure from any conventional source 108 through the conduits 106 and 111 under the control of the valve 102, which valve 12 is of any conventional type by which pressure fluid from the source 108 may be introduced into one end or the other of the cylinder 101 according to the position of a core bar 213. Said core bar moves in one direction or the other in response to the polarity of energization of the solenoid 214. Said solenoid is of any conventional, two-winding, type for controlling a two-position valve and each winding is connected through a manually controlled, conventional, reversing switch 215 into the series circuit 223 which includes the control switches 216, 217, 218, 219, 216a, 217a, 218a, and 219a, and a power source 220 for energizing said solenoid and urging the core thereof in one direction or the other according to the position of the reversing switch 215. The reversing switch 215 may be manually actuated by any conventional means under the direct control of the operator, such as a lever 221 mechanically connected to said switch 215 by a rod 222, and acts to connect one solenoid winding or the other to the circuit 223 and to the power source 220.

Each of said control switches is preferably a micro-switch of a conventional type and actuated by means such as the plungers 225, 226, 227, 228, 225a, 226a, 227a, and 228a, respectively. Said plungers are aligned with the shift rods 114, 115, 116, and 117, as shown, for actuation by the respectively adjacent ends of each of said shift rods. Said shift rods, which are of conventional form, may be as illustrated in some detail in said application Serial No. 133,404 and as further illustrated in more detail in the United States patent to Padgett, No. 1,943,694. Said shift rods are conveniently supported in the housing 127 of the main box 10, as shown in Figure 3. The control switches are also supported in said housing 127 and spaced from the respectively adjacent ends of the shift rods so that the plunger of each control switch will be engaged by the adjacent end of the aligned shift rod only when such shift rod is moved substantially fully to the end of its stroke and the gear engagement in the main gear group effected thereby is substantially fully accomplished.

Normally, the circuit 223 is closed. Engagement of the plunger of any one of the control switches by the shift rod associated therewith acts to open the particular switch so engaged, and thus open the circuit 223, thereby stopping the flow of current from the power source 220 through the reversing switch 215 to the solenoid 214. Under these conditions, actuation of the reversing switch 215 by the lever 221 will have no immediate effect upon the solenoid 214 or the valve 102.

Figure 2:
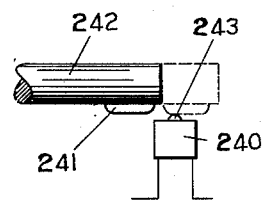
Figure 2 is a fragmentary view representing a variation from the apparatus illustrated in Figure 1.

In the modification appearing in Figure 2, the micro-switch 240 is operated by a cam 241 mounted on the side of a shift rod 242. As appearing in solid lines in Figure 2, the shift rod 242 is in its neutral position. When the shift rod is in its shifted position, as shown by the broken lines in Figure 2, it will actuate the plunger 243 of said micro-switch 240 thereby opening said switch and thus open the circuit 232.

Figure 1:
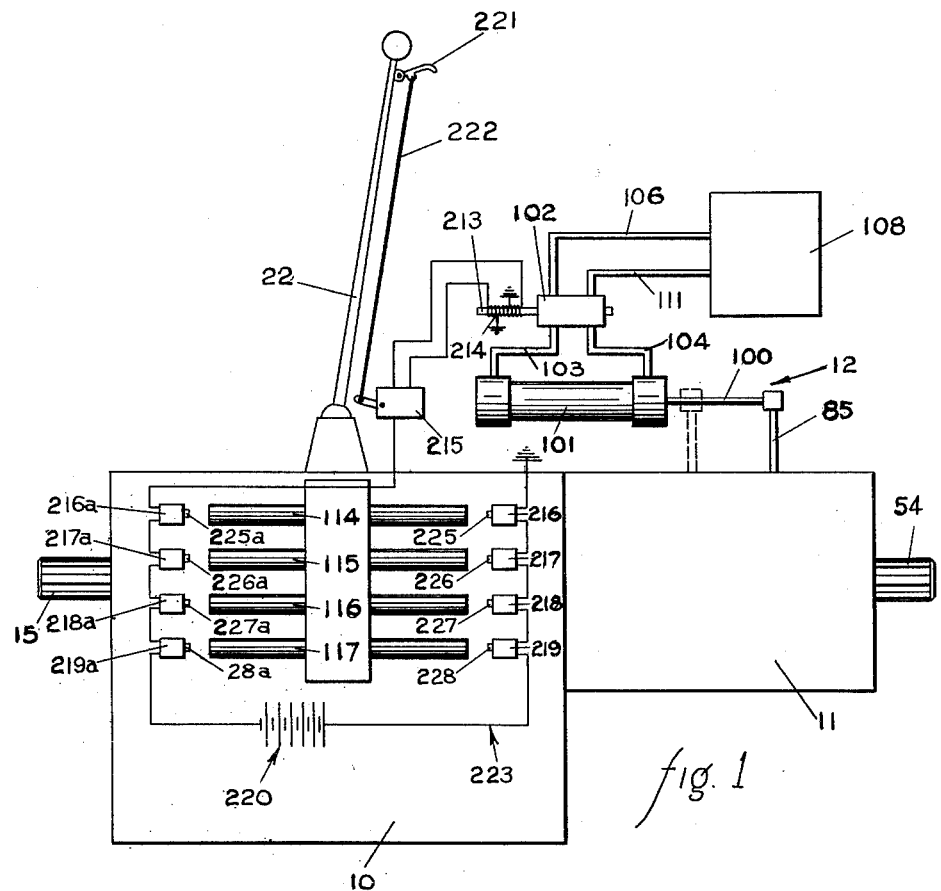
Figure 1 represents a schematic view of apparatus illustrating and embodying the invention.

Thus, with the structure shown in Figure 2, the point at which the plunger 243 of a micro-switch 240 is released is determined by the length of the cam 242, whereas by the structure shown in Figure 1 the contacts of the control switches are broken only when a shift rod is substantially in its fully shifted position and the contact is closed immediately after the shift rod starts to move toward its neutral position.

*Operation*

Although the operation of the shift control, to which this invention relates, is apparent from the above description, it will be reviewed in full in the interest of completeness.

The interengagement of the various corresponding gears within the transmission assembly 13, for the purpose of effecting the various above mentioned gear ratios, may be accomplished in a conventional manner by means of the shift lever 22 and the shift rods 114, 115, 116 and 117.

The clutch sleeve 81 in the auxiliary box 11 is moved axially along the auxiliary main shaft 54 (Figure 3) by means of the actuating arm 100 of the air cylinder 101 acting through the clutch fork 85. When the clutch sleeve 81 is in the leftward position it engages the output gear 48, thereby effecting a direct drive through the auxiliary box 11. When the clutch gear 81 is in the rightward position (Figure 3), it engages the auxiliary output gear 86, thereby effecting a reduction drive through the auxiliary box 11. The synchronizing clutches 79 and 80 provide means for reducing the speed of the main shaft 14 prior to engagement between the clutch sleeve 81 and the main output gear 48, in a conventional manner, and for speeding up the main shaft 14 and auxiliary countershaft 92 prior to engagement between the clutch sleeve 81 and the auxiliary output gear 86, also in a conventional manner.

It will now be assumed that the fork 85, when positioned as appearing in solid lines (Figure 1), effects a reduction drive through the gears in the auxiliary box 11, and when positioned as appearing in broken lines (Figure 1) it effects a direct drive through said auxiliary box. The description of said operation will commence with the auxiliary gear group in its lower speed ratio, in which case the lever 221 is preferably in a downward position, although this is a matter of choice.

With the main gear group, hence the shift rods 114, 115, 116 and 117, in neutral position prior to starting the engine (not shown), all of the control switches will be closed thereby energizing the solenoid 214. Such energization effects a positioning of the core bar 213 according to whichever winding of the solenoid 214 is energized as determined by the position of the reversing switch 215, so that the valve 102, actuated by the core bar 213, will permit fluid under pressure to flow from the source 108 through the conduit 106 and the conduit 103 to the leftward end of the cylinder 101 (Figure 1). Thus, if the fork is not in its solid line position (Figure 1) it will be so moved by the actuating arm 100.

When a shift is made in the main gear group, one of the control switches will be opened by the shift rod concerned, thereby opening the circuit 223 and de-energizing the solenoid 214, but this will have no effect upon the position of the core bar 213. Likewise, return of the main box to neutral, which re-energizes the solenoid 214, has no effect upon the position of the core bar 213 since the direction of urging of the core bar 213 by the solenoid remains the same. So long as the energized winding of the solenoid 214, which is controlled by the reversing switch 215, remains the same, the main gear group may be shifted into and out of neutral as often as desired without effecting a movement of the core bar 213, and hence no shift of the auxiliary gear group will occur.

However, when it is desired to shift the auxiliary box into direct drive, the lever 221 is manually moved upwardly, thereby reversing the switch 215. If the main gear group is in neutral, the circuit 223 is closed and the solenoid 214 is accordingly energized. A reversal of the switch 215 effects energization of the other winding of the solenoid 214, thereby actuating the core bar 213 which causes the valve 102 to change the flow of said fluid therethrough. The fluid now flows from source 108 through conduit 111 and conduit 104 to the rightward end (Figure 1) of the cylinder 101, thereby causing the arm 100 to move the fork 85 to its broken line position. The auxiliary box is thereby shifted into direct drive.

If the main gear group is in a shifted position when the lever 221 is moved, and this will be the normal situation, one of the control switches is open, thereby preventing flow of current to the solenoid. As soon as the shift rod which is out of neutral position is moved toward neutral position by the shift lever 22, the control switch being held open by said shift rod is permitted to close, thereby closing the circuit 223 and energizing the solenoid 214. Since the switch 215 has been reversed by upward movement, preselection, of the lever 221, the other winding of the solenoid 214 is now energized and the position of the core bar 213 is changed, thereby causing the valve to change the flow of fluid to the cylinder 181, which results in a shift of the auxiliary box in a manner substantially as described in the preceding paragraph.

The normal time required to complete the shift of the main box into neutral is absorbed by the normal lag in response of the parts of the auxiliary shifting mechanism, such as the solenoid 214, valve 182 and cylinder 181. Thus, even though the circuit 223 is closed immediately upon a shift rod starting toward neutral position, the main box will complete its return to neutral before the auxiliary box shifts sufficiently to engage its synchronizers.

Where, as may be true in some instances, it becomes desirable to delay slightly the closing of the circuit 223 to prevent shifting of the auxiliary box too early, such delay may be controlled to whatever precise extent is required by the alternate structure (Figure 2). By proper selection of the length of the cam 241, it is possible to effect release of the plunger 243, thereby closing the micro-switch 240, at any desired point in the travel of the shift rod 242.

It will now be noted that since the main gear group will normally be in gear during operation of the transmission, the circuit 223 will, accordingly, be broken by one of the control switches during the majority of the time and, therefore, the power source 220 will not be unreasonably depleted. When the vehicle with which the transmission is used is not in operation, the circuit 223 may advantageously be broken by the ignition key of said vehicle through conventional means (not shown).

Although the above mentioned drawings and description apply to one particular, preferred embodiment of my invention, it is not my intention, implied or otherwise, to eliminate other variations or modifications which do not depart from the scope of the invention unless specifically stated to the contrary in the hereinafter appended claims.

I claim:

1. In a change speed transmission for a vehicle, the combination comprising: a first change speed gear section having an input shaft; a second change speed gear section, including friction clutch synchronizing means connected serially with said first change speed gear section and having an output shaft; means operable for automatically initiating shifting of said second change speed gear section upon the commencement of motion in said first change speed gear section from a shift position toward neutral position; and manually operable means for rendering said last-named means operable or inoperable at the will of an operator.

2. In a change speed transmission for a vehicle, the combination comprising: a first change speed gear section having an input shaft; a second change speed gear section, including friction clutch synchronizing means, connected serially with said first change speed gear section and having an output shaft; power means for effecting shifting of said second change speed gear section; manually controllable means and automatic means serially connected with said manually controllable means, said automatic means being responsive to the position of the gears in said first section for energizing said power means, subject to the will of an operator, upon the commencement of motion in said first change speed gear section from a shift position toward neutral position.

3. In a change speed transmission for a vehicle, the combination comprising: a first change speed gear section having an input shaft; a second change speed gear section, including friction clutch synchronizing means, connected serially with said first change speed gear section and having an output shaft; shifting means automatically initiating engagement of said synchronizing means and shifting of said second change speed gear section upon the commencement of motion in said first change speed gear section from a shift position toward a neutral position, said shifting means including power means effecting engagement of said synchronizing means and shifting of said second change speed gear section; energizing means effecting energization of said power means; control means effective to hold said energizing means inoperative so long as the first change speed gear section is in any shifted position, said control means being rendered ineffective upon movement of said first change speed gear section toward its neutral position and prior to its arrival therein.

4. In a change speed transmission for a vehicle, the combination comprising: a first change speed gear section having a pair of shafts and gears thereon providing a plurality of speed ratios; a second change speed gear section connected in series with said first section and having at least two speed ratios, said ratios being spaced apart an amount greater than the spacing of the ratios in said first section; means including a pair of friction clutches associated with said second section for connecting through a selected ratio in said second section to the output of said transmission; pre-selectable means and means responsive both to the position of the first section and to one position of said pre-selectable means for initiating said connecting sufficiently prior to the disconnection of the gears of said first section upon their attaining neutral position that said connecting will take place substantially immediately upon the gears of the first section attaining neutral position.

5. In a change speed transmission for a vehicle, the combination comprising: a first change speed gear section having an input shaft and a second change speed gear section connected serially with said first change speed gear section and having an output shaft; electrically actuated means automatically initiating shifting of said second change speed gear section upon the commencement of motion in said first change speed gear section from a shift position toward neutral position, said means including power means effecting shifting of said second change speed gear section upon energization of said power means; means including an electric circuit effecting energization of said power means; blocking means holding said electric circuit open so long as the first change speed gear section is in any shifted position, and said blocking means closing said circuit upon movement of said first change speed gear section toward its neutral position and prior to its arrival therein.

6. The apparatus described in claim 3 including manually selectable means operative when in one selected position to render said shifting means wholly inoperable regardless of the position of said first change speed gear section.

7. The device defined in claim 5 wherein said blocking means includes an electrical switch axially aligned with a shift rod of said first change speed gear section and adapted to be placed in its open position by contact of the end of the shift rod therewith when said shift rod is in its fully shifted position.

8. The device defined in claim 5 wherein said blocking means includes a cam on the side of each of said shift rods adjacent an end thereof and a switch adjacent the path of movement of each of said rods and openable by said cam when said shift rod is adjacent to, and in, its fully shifted position.

9. In a main and auxiliary transmission assembly, wherein said main transmission has a plurality of shift rods associated therewith, a shift control for the auxiliary part of said assembly comprising in combination: pressure fluid actuated means connected to said auxiliary gear group for shifting same; a source of pressure fluid and a valve controlling the flow of pressure fluid in one direction or the other to said means; electrically responsive means controlling the position of said valve, and a source of electric power for energizing same; a manually actuatable switch determining the direction of operation of said electrically responsive means and a plurality of normally closed switches in series between said power source and said electrically responsive means; each of said switches being openable by one of said shift rods as it approaches one end of its normal travel into a shifted position.

10. In a shift control for the auxiliary gear group of a transmission having a plurality of shift rods in the main gear group thereof, the combination comprising: a hydraulic cylinder having an actuating arm connected to said auxiliary gear group for shifting same; a source of fluid under pressure, and means including a valve controlling the flow of fluid to said cylinder; a solenoid controlling the position of said valve and a source of electric power for energizing same; a switch controlling the direction of movement of said valve by said solenoid and manually actuatable means for reversing said switch; a plurality of normally closed switches in series with said power source, said switches each being openable by one of said shift rods as it approaches one end of its normal stroke into shifted position.

11. In a main and auxiliary transmission assembly, wherein said main transmission has a shift lever associated therewith, a shift control for the auxiliary part of said assembly comprising in combination: pressure fluid actuated means connected to said auxiliary gear group for shifting same; a source of pressure fluid and a valve controlling the flow of pressure fluid in one direction or the other to said means; electrically responsive means controlling the position of said valve, and a source of electric power for energizing same; a manually actuatable switch determining the direction of operation of said electrically responsive means and a plurality of normally closed switches in series between said power source and said electrically responsive means; means responsive to movement of said shift lever holding one of said normally closed switches open when, but only when, said shift lever is in a substantially fully shifted position.

12. In a change speed transmission for a vehicle, the combination comprising: a first change speed gear section having an input shaft; a second change speed gear section, including friction clutch synchronizing means, connected serially with said first change speed gear section and having an output shaft; shifting means automatically initiating engagement of said synchronizing means and effecting shifting of said second change speed gear section, said shifting means including power means effecting engagement of said synchronizing means and shifting of said second change speed gear section; energizing means effecting actuation of said power means; control means effective to hold said energizing means inoperative so long as the first change speed gear section is in any shifted position, said control means permitting said energizing means to actuate said power means upon movement of said first change speed gear section toward its neutral position and prior to its arrival therein.

13. In a main and auxiliary transmission assembly, wherein said main transmission has a plurality of shift rods associated therewith, a shift control for the auxiliary part of said assembly comprising in combination: pressure fluid actuated means connected to said auxiliary gear group for shifting same; a source of pressure fluid and a valve controlling the flow of pressure fluid in one direction or the other to said means; electrically responsive means controlling the position of said valve, and a circuit including a source of electric power for energizing same; a manually actuatable switch in said circuit determining the direction of operation of said electrically responsive means and further electrically responsive control means in said circuit in series with said electrically responsive operating means and with said power source for holding said circuit open whenever said main transmission is in a shift position and for permitting said circuit to close upon the movement of said main transmission toward its neutral position and prior to its arrival therein.

14. In a main and auxiliary transmission assembly, wherein said main transmission has a shift control mechanism associated therewith, a shift control for the auxiliary part of said assembly comprising in combination: pressure fluid actuated means connected to said auxiliary gear group for shifting same; a source of pressure fluid and a valve controlling the flow of pressure fluid in one direction or the other to said means; electrically responsive operating means for moving said valve to a selected position and a circuit including a source of electric power for energizing same; a manually actuatable switch in said circuit determining the direction of operation of said electrically responsive means and a further electrically responsive control means in said circuit in series with said electrically responsive operating means and with said power source, said electrically responsive control means cooperating with said shift control mechanism for holding said circuit open whenever said main transmission is in a shifted position and for permitting said circuit to close upon the movement of said main transmission toward its neutral position and prior to its arrival therein.

15. In a multiple speed, heavy duty transmission, the combination comprising: a main gear group having a range of gear ratios approximately equal to one half the range of the speed ratios in the entire device; an auxiliary gear group having high and low speed ratios wherein the speed differential is approximately equal to the range of speed ratios in the main group; and operating means for initiating shifting of the auxiliary group immediately upon the main group's commencing movement toward the neutral position; manually controlled preselectable means rendering said operating means operable and inoperable at the will of an operator; whereby actuation of said preselectable means, followed by movement of the main group toward neutral position, at the end of a shift progression through the ratios of the main gears effects an automatic shift of the auxiliary gear group.

16. In a change speed transmission for a vehicle, the combination comprising: a first change speed gear section having a pair of shafts, including a main shaft and gears thereon providing plurality of speed ratios; a second change speed gear section connected in series with said first section and having at least two speed ratios, said ratios being spaced apart an amount greater than the total spacing of the ratios in said first section; means including a pair of friction clutches associated with said second section for connecting the input of said second section through a selected ratio in said second section to the output of said transmission; preselectable means and means responsive both to the position of said first section and to one position of said preselectable means for initiating said connecting substantially immediately upon the gears of the first section commencing movement toward neutral position but prior to their arrival in neutral position; whereby during simultaneous, oppositely directioned substantially equal shifts of said first section and said second section, the connection of said main shaft to said second section output will utilize the vehicle inertia to affect the speed of rotation of said main shaft in such a direction and to such an extent as to facilitate completion of a shift in said first section.

17. In a change speed transmission for a vehicle the combination comprising: a first change speed gear section having a main shaft and a countershaft and gears thereon providing a plurality of substantially equally spaced speed ratios; a second change speed gear section connected to the output end of, and in series with, said first section and having at least two speed ratios, said ratios being spaced apart an amount greater than the spacing of selected ratios in said first section; means including a pair of friction clutches associated with said second section for connecting said main shaft through a selected ratio in said section to the output of said transmission; means normally operable to initiate said connecting immediately upon movement of said first section toward neutral position from any gear ratio position but prior to its arrival in neutral position; manually actuatable means actuatable independently of the position of said first change speed gear section for rendering said last named means operable or inoperable; whereby during simultaneous oppositely directioned substantially equal shifts of said first section and said second section, the connection of said main shaft to said second section output will utilize the vehicle inertia to affect the speed of rotation of said main shaft in such a direction and to such an extent as to facilitate completion of a shift in said first section.

18. In a change speed transmission for a vehicle having a propeller shaft, the combination comprising: a first change speed gear section having a pair of shafts and gears thereon providing a plurality of speed ratios; means including a shift lever for shifting the gears in said first change speed gear section; a second change speed gear section connected in series with said first section and having at least two speed ratios, said ratios being spaced apart an amount greater than the total spacing of the ratios in said first section; normally inoperative means including a pair of friction clutches effective when operative for utilizing energy derivable from the vehicle propeller shaft for driving the main shaft of said first section and changing the speed of said main shaft by an amount equal to the range of ratios in the second section and in a direction corresponding to the speed at which said shaft will be driven in its next shifted position; a pair of independent means serially arranged, one responsive to the control of an operator and the other actuated immediately as, and each time that, said first change speed gear section moves from a shifted position toward its neutral position and prior to its arrival in neutral position for rendering operative said normally inoperative means; whereby during simultaneous, oppositely directioned, substantially equal shifts of said first section and said second section, the connection of said main shaft through said pair of friction clutches to the output of said second section will utilize the vehicle inertia to affect the speed of rotation of the main shaft in such direction and to such an extent as to reduce the effective shift required to be made in the first section by an amount equal to the ratio difference existing in the second section.

19. In a shift control for the auxiliary gear group of a transmission having a plurality of shift rods in the main gear group thereof, the combination comprising: a hydraulic cylinder having an actuating arm connected to said auxiliary gear group for shifting same; a source of fluid under pressure, and means including a valve controlling the flow of fluid to said cylinder; a solenoid controlling the position of said valve and a circuit including a source of electric power for energizing same; a switch in said circuit controlling the direction of movement of said valve by said solenoid and manually actuatable means for reversing said switch; means cooperating with said shift control mechanism, and in series with said power source and said solenoid, for opening said circuit when said main gear group is in a shifted position and for closing said circuit when said main gear group commences movement from a shifted position toward neutral position and prior to its arrival in its neutral position.

20. In a change speed transmission for a vehicle, the combination comprising: a first change speed gear section having a pair of shafts and gears thereon providing a plurality of substantially equally spaced speed ratios; a second change speed gear section connected in series with said first section and having at least two speed ratios, said ratios being spaced apart an amount greater than the spacing of a selected portion of the ratios in said first section; means including a pair of friction clutches associated with said second section for connecting one of said shafts through a selected ratio in said second section to the output of said transmission; manually operable means and means responsive both to the position of the first section and to one position of said manually operable means for initiating said connecting sufficiently prior to the disconnection of the gears of said first section upon their attaining neutral position that said connecting will take place substantially immediately upon the gears of the first section attaining neutral position.

21. In a change speed transmission for a vehicle, the combination comprising: a first change speed gear section having an input shaft; a second change speed gear section including friction clutch synchronizing means connected serially with said first change speed gear section and having an output shaft; automatically operable means movable into position for initiating shifting of said second change speed gear section upon the commencement of motion in said first change speed gear section from the shift position toward neutral position; and manually operable means serially connected to said automatically operable means for permitting or preventing the said operation of said automatically operable means according to the will of an operator.

22. In a main and auxiliary transmission assembly, wherein said main transmission has a shift mechanism associated therewith, a shift control for the auxiliary part of said assembly comprising in combination: pressure fluid actuated means connected to said auxiliary transmission for shifting same; a source of pressure fluid and a valve controlling the flow of pressure fluid in one direction or the other to said means, said pressure fluid being at all times applied in said one direction or in said other direction to said means according to the position of said valve; electrically responsive means controlling the position of said valve, and a source of electric power for energizing same; a manually actuatable switch determining the direction of operation of said electrically responsive means and an automatically operable switch in series between said power source and said manually actuatable switch, means cooperating with said shift mechanism for said main transmission for actuating said automatically operable switch upon movement of said transmission shift mechanism from a shifted position toward its neutral position but prior to entry into said neutral position.

THOMAS BACKUS.

References Cited in the file of this patent

UNITED STATES PATENTS

| Number | Name | Date |
|---|---|---|
| 1,866,662 | Matthews | July 12, 1932 |
| 1,916,891 | Padgett | July 4, 1933 |
| 1,943,694 | Padgett | Jan. 16, 1934 |
| 2,161,153 | Gallum et al. | June 6, 1939 |
| 2,231,966 | Swennes et al. | Feb. 18, 1941 |
| 2,365,732 | Snow | Dec. 26, 1944 |
| 2,445,716 | Sternberg | July 20, 1948 |
| 2,465,885 | Koster et al. | Mar. 29, 1949 |
| 2,522,228 | Hukill | Sept. 12, 1950 |